(12) United States Patent  
Noh

(10) Patent No.: US 6,383,234 B1  
(45) Date of Patent: May 7, 2002

(54) METHOD OF MANUFACTURING A PRISMATIC LITHIUM SECONDARY BATTERY

(75) Inventor: Hyung-kon Noh, Seoul (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/541,044

(22) Filed: Mar. 31, 2000

(30) Foreign Application Priority Data

Apr. 9, 1999 (KR) ............................................. 99-12509

(51) Int. Cl.[7] ................................................ H01M 6/00
(52) U.S. Cl. ..................... 29/623.1; 29/623.2; 29/623.3; 29/623.4; 29/623.5
(58) Field of Search ............................. 29/623.1, 623.2, 29/623.5, 623.3, 623.4

(56) References Cited

U.S. PATENT DOCUMENTS

| | | | | |
|---|---|---|---|---|
| 3,770,504 A | * | 11/1973 | Bergum ........................ | 136/10 |
| 4,080,728 A | * | 3/1978 | Buckler ........................ | 29/623.4 |
| 4,458,411 A | * | 7/1984 | Dey et al. .................... | 29/623.2 |
| 5,460,904 A | * | 10/1995 | Gozdz et al. ................ | 429/192 |
| 5,470,357 A | * | 11/1995 | Schmutz et al. ............. | 29/623.5 |
| 5,498,489 A | * | 3/1996 | Dasgupta et al. ............ | 424/152 |
| 5,549,717 A | * | 8/1996 | Takeuchi et al. ............ | 29/623.2 |
| 5,958,088 A | * | 9/1999 | Vu et al. ...................... | 29/623.1 |
| 6,024,773 A | * | 2/2000 | Inuzuka et al. .............. | 29/623.4 |
| 6,051,038 A | * | 4/2000 | Howard et al. .............. | 29/623.1 |
| 6,156,080 A | * | 12/2000 | Kumeuchi et al. .......... | 29/623.1 |
| 6,190,426 B1 | * | 2/2001 | Thibault et al. ............. | 29/623.1 |
| 6,225,010 B1 | * | 5/2001 | Hamano et al. ............. | 429/306 |

* cited by examiner

*Primary Examiner*—Tom Dunn
*Assistant Examiner*—L. Edmondson
(74) *Attorney, Agent, or Firm*—Leydig, Voit & Mayer, Ltd.

(57) ABSTRACT

A method for manufacturing a prismatic lithium secondary battery having an electrode assembly having a separation film between a positive electrode plate and a negative electrode plate, the method including forming separation films, and positive and negative plates having a narrower width than the separation films, alternately interposing the positive and negative plates between the separation films and stacking the plates and films, hermetically sealing opposite sides of the separation films by heating along a lengthwise direction to form an electrode assembly, and immersing the electrode assembly in an electrolyte solution, putting the assembly into a case, and hermetically sealing the case.

2 Claims, 3 Drawing Sheets

METHOD OF MANUFACTURING A PRISMATIC LITHIUM SECONDARY BATTERY

BACKGROUND OF THE INVENTION

1. Field of the Invention

The present invention relates to a method for manufacturing a lithium secondary battery having a prismatic shape, and more particularly, to a method for making a prismatic lithium secondary battery which has an electrode assembly having a separating film between a positive electrode plate and a negative electrode plate.

2. Description of the Related Art

In forming an electrode assembly for a prismatic lithium secondary battery, conventionally, a positive electrode plate and a negative electrode plate are alternately interposed between separation films and stacked. Then, the stacked plates are passed through between heated rollers and laminated. The reason for laminating the stacked plates is for incorporating the respective plates without being separated from each other.

However, the laminating step necessitates infiltration of an electrolytic solution into the tightly fixed electrode assembly in a subsequent processing step. To solve this problem, conventionally, a plasticizer in a relatively high composition ratio was added to a solution applied to the surfaces of positive and negative electrode current collectors, in the process of forming a positive electrode plate and a negative electrode plate. The composition ratio is generally about 20% by weight. The reason why the plasticizer is added to the solution is to increase the adhesion of the respective plates and to infiltrate the electrolytic solution into a space produced by extracting the plasticizer after forming the electrode assembly.

To sum up, according to the conventional method in which a laminating step is required, the following problems occur. First, since interface resistance between the respective plates increases due to lamination, unnecessary energy consumption is caused due to the interface resistance. Second, since a plasticizer in a relatively high composition ratio is added to a solution used for coating positive and negative electrode plates, the composition ratio of active materials becomes relatively low. Thus, the output capacity of a prismatic lithium secondary battery is reduced and the life thereof is shortened. Finally, since a laminating step and a plasticizer extracting step are necessary, the productivity of prismatic lithium secondary batteries is lowered.

SUMMARY OF THE INVENTION

To solve the above problems, it is an object of the present invention to provide a method for manufacturing a lithium secondary battery of a prismatic type, by which the internal energy consumption can be reduced, and the output capacity and cycle life of the battery can be improved, and the productivity thereof can be enhanced.

Accordingly, to achieve the above object, there is provided a method for manufacturing a lithium secondary battery of a prismatic type having an electrode assembly having a separation film between a positive electrode plate and a negative electrode plate, the method including the steps of forming a plurality of separation films, and positive and negative plates having a narrower width than the separation films, alternately interposing the positive and negative plates between the separation films and stacking the same, hermetically sealing both sides of the separation films by heating along the lengthwise direction to form an electrode assembly, and immersing the electrode assembly in an electrolytic solution and putting the same into a case to then be hermetically sealed.

According to the present invention, since the both sides of the separation films are hermetically sealed by heating along the lengthwise direction, the respective plates can be incorporated without being separated from each other for performing subsequent steps. Thus, unlike in the conventional technology, no lamination is necessary in the present invention.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

For one embodiment of the present invention, a method for manufacturing a lithium secondary battery using two electrode assemblies will be described. Here, a unit electrode assembly is constructed such that first, second, third and fourth separation films are sequentially stacked, a first positive electrode plate is interposed between the first and second separation films, a negative electrode plate is interposed between the second and third separation films and a second positive electrode plate is interposed between the third and fourth separation films. Thus, in order to form two sets of the aforementioned electrode assembly, eight separation films, four positive electrode plates and two negative electrode plates are necessary.

Figure 1:
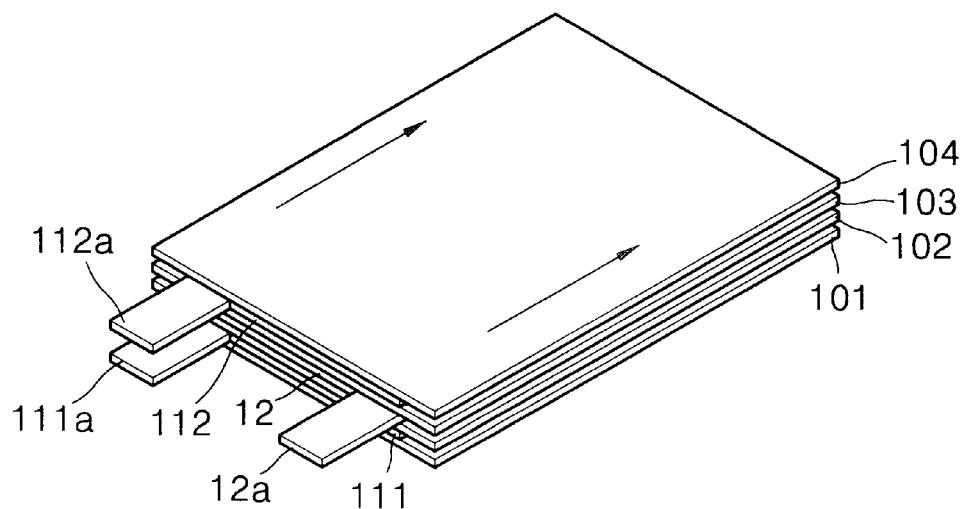
FIG. 1 is a perspective view illustrating a state where separation films, positive electrode plates and a negative electrode plate are stacked according to the present invention.

FIG. 1 illustrates a state where four separation films 101, 102, 103 and 104, two positive electrode plates 111 and 112 and a negative electrode plate 12 are stacked. Here, the first positive electrode plate 111 is interposed between the first and second separation films 101 and 102, the negative electrode plate 12 is interposed between the second and third separation films 102 and 103 and the second positive electrode plate 112 is interposed between the third and fourth separation films 103 and 104.

The base films of the second and third separation films 102 and 103 are made of either polyvinylidene fluoride/hexafluoropropylene or polyvinyl chloride having a high ion conductivity. Conversely, the base films of the first and fourth separation films 101 and 104 are made of polyethylene having high strength. A coating of a solution having the following composition ratio is applied to the surfaces of the base films and dried, thereby completing the separation films 101, 102, 103 and 104. The composition of the solution is 32% of a binder, 42% of a plasticizer and 26% of an additive. Here, the binder and the plasticizer are materials for adjusting mechanical properties of the base films.

The base films of the first and second positive electrode plates 111 and 112, that is, charge collectors, are aluminum. A solution having the following composition ratio is applied to the surfaces of the current collectors and then dried. The composition ratio of the solution is 83.5% of an active material, 10% of a binder and 6.5% of a conductive agent. It is notable that no plasticizer is contained in the solution applied to the positive electrode plates 111 and 112 of the present invention. After the solution is applied to and dried, the front edges of the positive electrode plates 111 and 112 are punched and cut, thereby forming positive electrode tabs 111a and 112a.

The base film of the negative electrode plate 12 is copper. A solution having the following composition ratio is applied to the surface of the base film and then dried. The composition ratio of the solution is 76.75% of an active material, 10% of a binder and 3.25% of a conductive agent. As in the case of the positive electrode plates, no plasticizer is contained in the solution applied to the negative electrode plate 12 of the present invention. After the solution is applied and dried, the front edge of the negative electrode plate 12 is punched and cut, thereby forming a negative electrode tab 12a.

Figure 2:
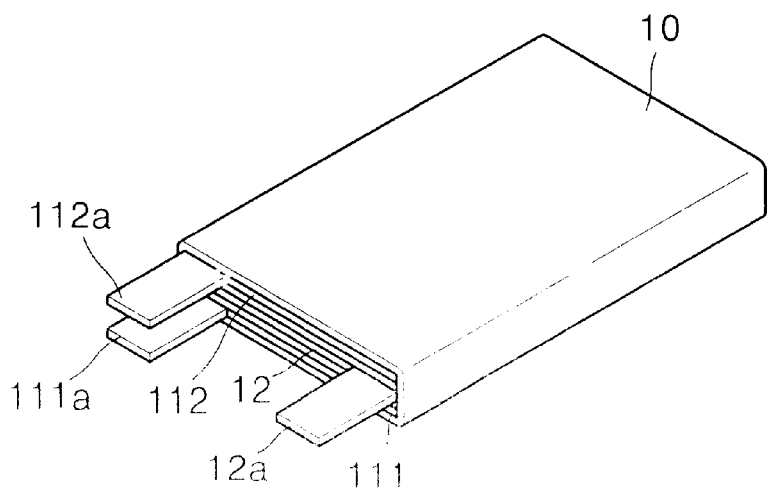
FIG. 2 is a perspective view of an electrode assembly with both sides of a stacked structure shown in FIG. 1 are hermetically sealed.

As described above, the respective plates are stacked and then both sides of the separation films 101, 102, 103 and 104 are hermetically sealed by heating along a lengthwise direction, thereby forming a unit electrode assembly. FIG. 2 shows an electrode assembly formed by sealing both sides of the stacked structure shown in FIG. 1. In FIG. 2, the same reference numerals as those in FIG. 1 denote the same elements. Referring to FIG. 2, since the both sides of the separation film 10 are hermetically sealed by heating along the lengthwise direction, the respective plates can be incorporated, without being separated from each other in a subsequent processing step. Thus, it is not necessary to perform a laminating step, unlike in the conventional technology. In order to increase the degree of incorporation, the rear surfaces of the separation films 10 are sealed by heating.

Figure 3:
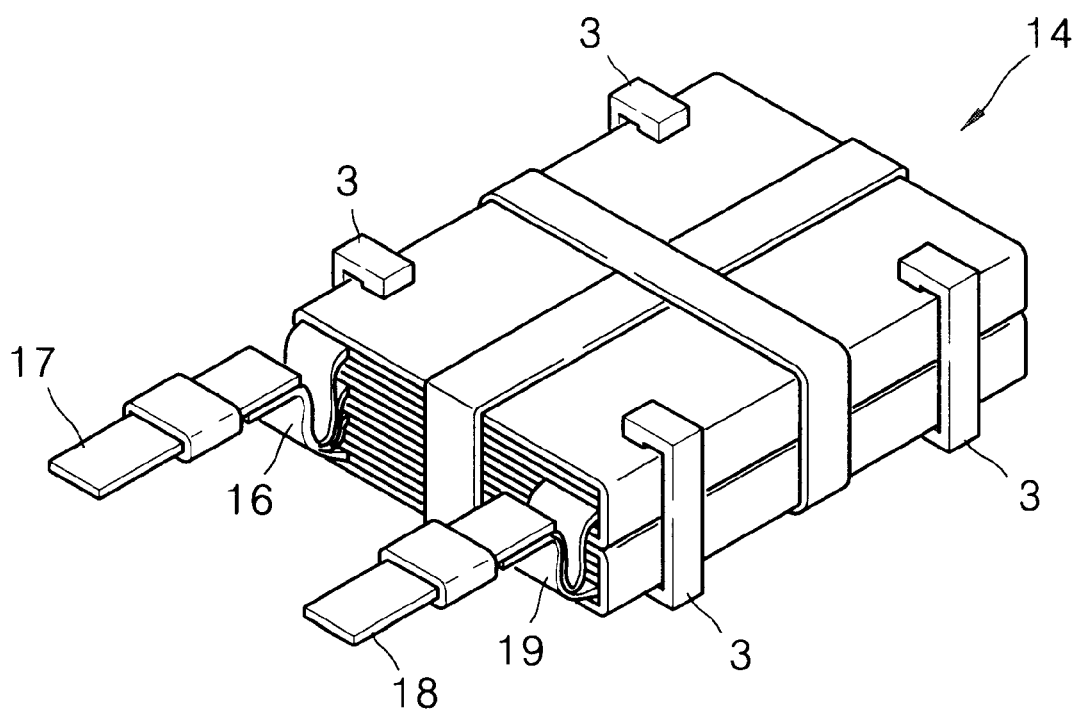
FIG. 3 is a perspective view illustrating a state where terminals of two sets of the electrode assembly shown in FIG. 2 are welded.

In order to fabricate a unit battery, it is necessary to form two sets of the aforementioned electrode assemblies. FIG. 3 shows a state where terminals 17 and 18 of two sets of the electrode assembly shown in FIG. 2 are welded. Referring to FIG. 3, a pair of electrode assemblies 14 are closely fixed by clips 3 and then bound with a tape or rubber band. Positive electrode tabs 16 and negative electrode tabs 19 of the thus-bound electrode assemblies 14 are folded together to be welded to the positive electrode terminal 17 and the negative electrode terminal 18, respectively.

The pair of electrode assemblies 14 having the positive and negative electrode terminals 17 and 18 are immersed in a corresponding electrolytic solution for 3 hours. Here, since each electrode assembly of the battery cell is formed without a laminating step, the electrolytic solution can sufficiently infiltrated into the electrode assembly. The outer surface of the pair of electrode assemblies 14 having the electrolytic solution completely infiltrated thereinto is elaborately cleaned and then put into a case to be hermetically sealed, thereby completing a prismatic lithium secondary battery.

Figure 4:
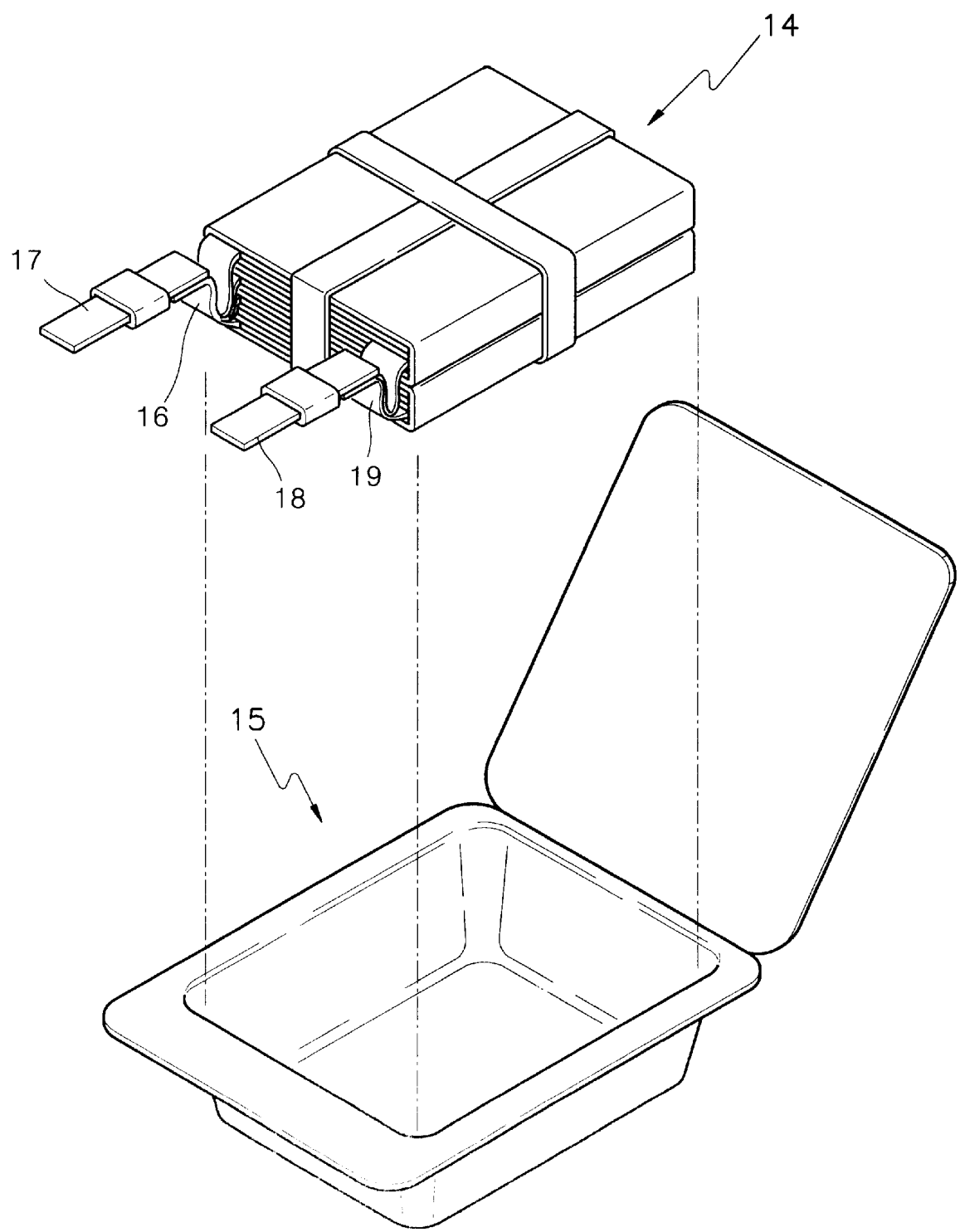
FIG. 4 is a perspective view illustrating a state where a pair of electrode assemblies shown in FIG. 3 are completed and then mounted in a case.

FIG. 4 shows a state where the pair of electrode assemblies 14 shown in FIG. 3 are completed and then put into a case 15. Referring to FIG. 4, when the completed pair of electrode assemblies 14 are put into the case 15 and then the case 15 is hermetically sealed, the positive and negative electrode terminals 17 and 18 protrude outside the case 15.

As described above, according to the method for manufacturing a prismatic lithium secondary battery, since both sides of separation films are sealed by heating along a lengthwise direction, the respective plates can be incorporated without being separated from each other. In other words, unlike the conventional technology, since no lamination is necessary, the following advantages can be attained by the present invention. First, since interface resistance between the respective plates, which is due to lamination, is reduced, the energy consumption due to the interface resistance can be reduced. Second, since it is not necessary to add a plasticizer to a solution used for coating positive and negative electrode plates, the composition ratio of an active material can be relatively increased. Accordingly, the output capacity and life of the prismatic lithium secondary battery can be increased. Third, since a laminating step and a plasticizer extracting step are not performed, the productivity of the prismatic lithium secondary battery can be increased.

While the present invention has been described with respect to what is presently considered to be the preferred embodiment, it is to be understood that the present invention is intended to cover various modifications and equivalent arrangements included within the spirit and scope of the appended claims. Accordingly, the true scope and spirit of the invention will be indicated by the following claims.

What is claimed is:

1. A method for manufacturing a prismatic lithium secondary battery having an electrode assembly with a separation film between each pair of a positive electrode plate and a negative electrode plate, the method comprising:

preparing a plurality of generally rectangular separation films, each separation film having a first width between opposite longitudinal edges of the separation film, and generally rectangular positive and negative plates having a second width narrower than the first of the separation films;

alternately stacking the separation films and the positive and negative plates, so that each positive and negative plate is interposed between two of the separation films, to form a stack;

hermetically sealing the longitudinal edges of all of the separation films in the stack by heating along a longitudinal direction of the stack to form an electrode assembly; and immersing the electrode assembly in an electrolyte solution and putting the electrode assembly into a case and hermetically sealing the case.

2. The method according to claim 1, including forming a plurality of the electrode assemblies, stacking and binding together the electrode assemblies, and, thereafter, immersing the electrode assemblies in the electrolyte solution.

* * * * *